United States Patent [19]

Kondo

[11] 4,267,425

[45] May 12, 1981

[54] STUD WELDING APPARATUS

[75] Inventor: Yoshiteru Kondo, Toyohashi, Japan

[73] Assignee: USM Corporation, Farmington, Conn.

[21] Appl. No.: 34,590

[22] Filed: Apr. 30, 1979

[30] Foreign Application Priority Data

May 9, 1978 [JP] Japan .................................. 53/54843

[51] Int. Cl.³ ............................................. B23K 9/20
[52] U.S. Cl. .................................................... 219/98
[58] Field of Search .................................... 219/98, 99

[56] References Cited

U.S. PATENT DOCUMENTS

| | | | |
|---|---|---|---|
| 2,442,449 | 6/1948 | Zimmerman | 219/98 |
| 3,321,607 | 5/1967 | Falcone et al. | 219/98 |
| 3,522,409 | 8/1970 | Fay et al. | 219/98 |
| 3,546,420 | 12/1970 | Ettinger | 219/98 |
| 3,723,700 | 3/1973 | Ettinger | 219/98 |
| 3,854,027 | 12/1974 | Ettinger et al. | 219/98 |

*Primary Examiner*—C. C. Shaw
*Attorney, Agent, or Firm*—Aubrey C. Brine; Vincent A. White

[57] ABSTRACT

A stud welding apparatus is provided wherein loading of the studs to the gun is automatically accomplished. The gun is capable of detecting stud supply as well as gun position to perform the welding operation in a reliable and efficient manner.

4 Claims, 7 Drawing Figures

STUD WELDING APPARATUS

BACKGROUND OF THE INVENTION

This invention relates to a stud welding apparatus of the type in which studs to be welded are automatically supplied.

Stud welding has come into use in various fields in recent years and a stud welding gun is also incorporated frequently in various automatic jigs. However, loading of the studs into the welding gun has conventionally been manually accomplished and hence, fully automatic welding work can not be attained unless the correct work position of the welding gun is automatically detected.

It is therefore the object of the present invention to provide a stud welding apparatus which can detect stud supply as well as welding gun position in a fully automatic manner and perform welding work safely and reliably.

BRIEF DESCRIPTION OF THE DRAWINGS

A preferred embodiment of the present invention will now be explained with reference to the accompanying drawings in which.

DESCRIPTION OF A PREFERRED EMBODIMENT

Figure 1:
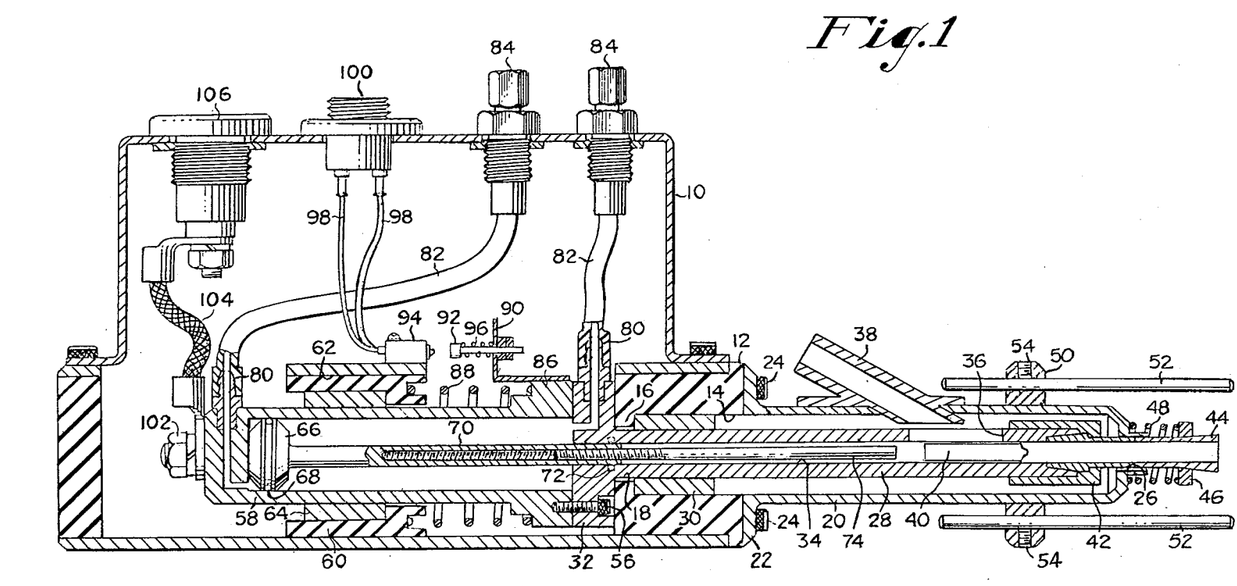
FIGS. 1 through 3 are longitudinal sectional views of the stud welding gun in accordance with the present invention, each showing a varying work position.
Figure 2:
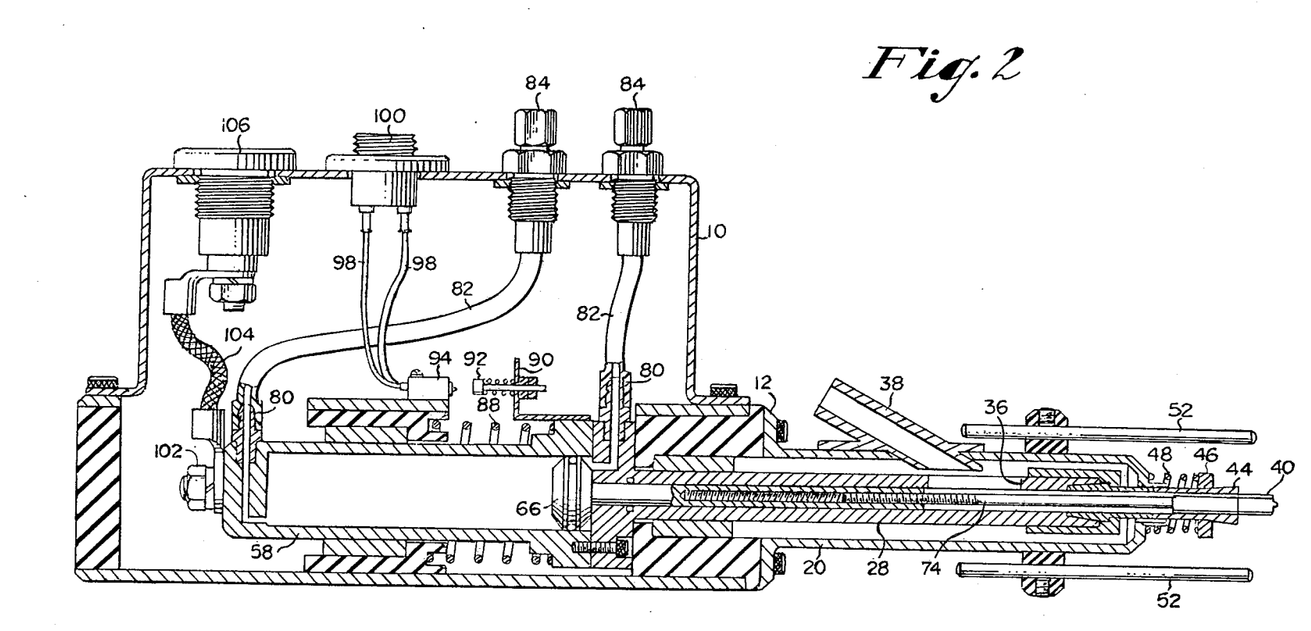
Figure 3:
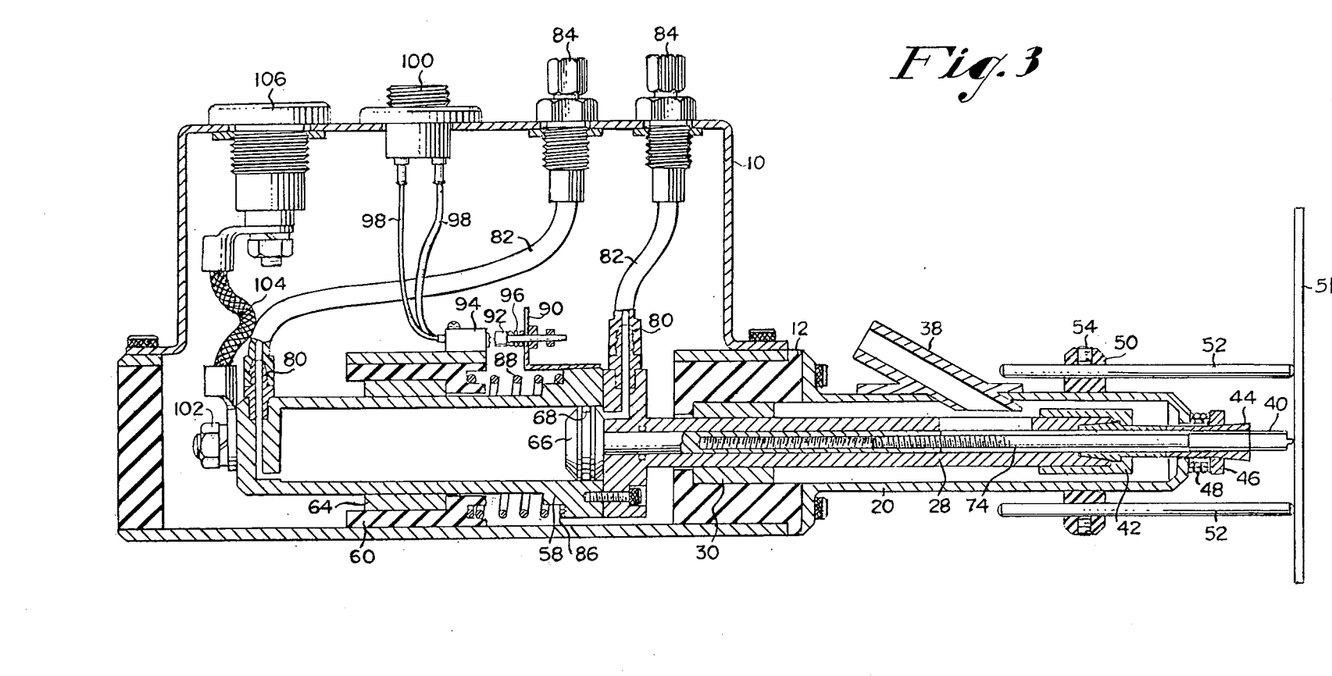

In FIGS. 1 through 3, the stud welding apparatus in accordance with the present invention is shown composed of a body housing 10, an insulator 12 secured to the front end of the body housing and a gun housing secured also to the body housing via the insulator. The insulator 12 has a longitudinal hole 14 extending in the axial direction substantially coaxial with its axis, and an inward flange 16 is formed at the rear end of this hole to thereby define a reduced diameter hole 18. A rear flange 22 of the cylindrical gun housing 20 is secured to the front surface of the insulator 12 by a screw 24. The gun housing 20 extends forwardly with respect to the body housing 10 and has an opening 26 formed at its tip portion.

A spindle 28 of an electrically conductive material is incorporated in the gun housing 20 concentrically therewith and spaced from its inner wall. The spindle is slidably supported by a bearing element 30 that is incorporated in the longitudinal hole 14 of the insulator 12 to penetrate therethrough. A flange 32 having a large thickness is provided at the rear end of the spindle 28 positioned at the back of the insulator 12 so that when the flange abuts the rear surface of the insulator, the spindle 28 is prevented from advancing further. The spindle 28 has a throughhole 34 extending in its axial direction, the throughhole 34 functioning as the stud passage. A side port 36 is formed in the side wall at the forward portion of the spindle 28 in communication with the throughhole 34. The side port 36 is in alignment with a tubular member 38 which is attached to the side wall of the gun housing 20 and provides a stud supply port. The tubular member 38 has an axis which describes an acute angle with respect to the axis of the spindle 28, and is connected to a stud supply source not shown. As will be described later in further detail, studs 40 fed from the supply source are conveyed into the hole 34 of the spindle 28 after passing through the side port 36.

A collet 44 is mounted concentrically to the tip portion of the spindle 28 by a collet nut 42 and protrudes outward beyond the opening 26 at the tip of the gun housing 20. As is known in the art, the collet 44 is furnished with slits in the longitudinal direction and has a tip which tends to expand outwardly and resiliently. A bushing 46 is positioned around the outer circumference of the collet tip which is reversely tapered. The bushing is constantly urged forward by a spring 48 and tends to close the collet tip.

Three legs 52 of an electrically conductive material (only two being shown in the drawing) are secured by a screw 54 to gun housing 20 around its outer circumference in front of the tubular member 38 with a predetermined gap between them in the circumferential direction. These legs extend forward beyond the tip of the gun housing in parallel with one another.

A cylinder 58 of an electrically conductive material is secured by a screw 56 onto the rear surface of the thick flange 32 of the spindle 28. In the same way as the spindle 28, this cylinder is slidably supported by a bearing element 64 incorporated in a hole 62 of an insulator 60 and permitted to move back and forth together with the spindle 28.

The cylinder 58 slidably incorporates a piston 66 therein and an O-ring 68 is fitted into a groove formed around the outer circumference of the piston 66. A piston rod 70 extends forwardly from this piston 66 and is slidably fitted into the hole 34 of the spindle 28. The gap between the piston rod 70 and the spindle hole 34 is sealed by another O-ring 72. The rear end of a push pin 74 is screwed into the tip of the piston rod 70; hence, the push pin extends forwardly and concentrically with the hole 34 of the spindle 28 and is spaced from the inner wall of the hole. As will be described later, the push pin 74 functions to push forward the studs 40 supplied into the spindle hole 34.

Both front and rear ends of the cylinder 58 are respectively connected by hoses 82 via nipples 80 to connectors 84 that are respectively secured to the body housing 10. These connectors are connected to a suitable pressure fluid source (not shown) via suitable valve means. Accordingly, when a pressurized fluid (usually, the air) flows into the cylinder 58 on the front side of the piston 66, the piston moves backward and when the pressurized fluid flows into the cylinder on the back side of the piston, the piston moves forward.

The cylinder 58 is constantly pushed forward by a spring 88 interposed between its front shoulder 86 and the insulator 60. As will be described later, when the stud 40 supported by the collet 44 is pushed against the work surface, the cylinder 58 is permitted to move backward via the collet 44 and the spindle 28 against the force of the spring 88.

An actuator 92 is mounted to the cylinder 58 via a bracket 90. This actuator engages a micro-switch 94 secured to the insulator 60 at the retreat position of the cylinder as shown in FIG. 3 and actuates the micro-switch. The actuator 92 is of such a type that is urged by a spring 96 towards the micro-switch 94 and does not apply excessive force to the same. The micro-switch 94 is electrically connected to an electric connector 100 secured by a cable 98 to the body housing 10 and wired to electric control means which will be described elsewhere. Similarly, a cable 104 secured by a nut 102 to the rear end of the cylinder 58 also is wired via a similar electric connector 106 to the electric control means. The three legs 52 secured at the forward end portion of the gun housing 20 are likewise wired to the electric control means, though not shown in the drawing.

Figure 4:
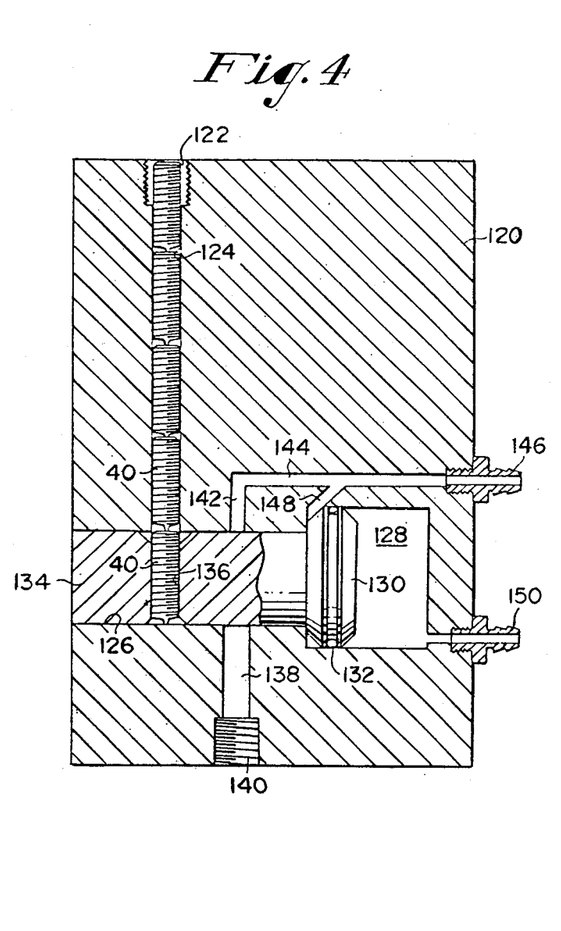
FIGS. 4 and 5 are sectional views of the stud feed device which may be used in the stud welding gun of the present invention.
Figure 5:
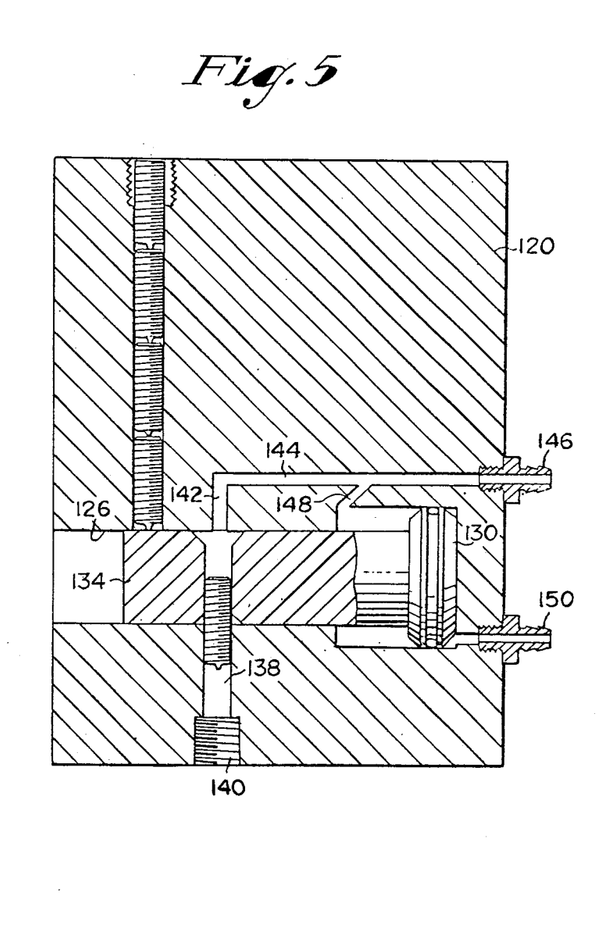

FIGS. 4 and 5 illustrate a stud supply device used in conjunction with the stud welding apparatus in accordance with the present invention. The stud supply device has a block 120 which in turn has a stud inlet 122 in communication with a stud passage 124. A large diameter hole 126 is formed in the transverse direction relative to stud passage 124 and has an outer end opening to the side surface of the block 120 and an expanded inner end forming an operation chamber 128. A piston head 130 is slidably fitted into the operation chamber 128 and its outer circumference is sealed by an O-ring 132. A piston shaft 134 is slidably fitted into the large diameter hole 126 and its outer diameter is in conformity with the length of the stud 40. A through-hole 136 is defined in the direction of the diameter of piston shaft 134. When the piston is located at the left-hand position as shown in FIG. 4, the through-hole aligns with the stud passage 124 and receives the stud. When the piston is located at the right-hand position as shown in FIG. 5, the through-hole 136 is in alignment with another stud passage 138 formed on the block 120, the stud passage having an outlet 140 communicating with the tubular member 38 shown in FIGS. 1 through 3.

The stud passage 138 is in alignment with a pressure passage 142 defined in the radial direction of the large diameter hole 126 and the pressure passage 142 is communicated with a pressurized fluid inlet 146 via a communication passage 144, which in turn communicates with one end of the operation chamber 128 via an inclined passage 148. The opposite side of the operation chamber is communicated with a pressurized fluid port 150. Inflow and outflow of the pressure fluid into and from the operation chamber 128 are made by controlling a pressure fluid source (not shown) connected to the fluid ports 146, 150, by means of a suitable valve mechanism.

When the pressurized fluid flows into the pressure fluid port 150, the piston moves leftward and its through-hole 136 receives one stud 40. Next, when this pressure is released and the pressurized fluid allowed to flow into another port 146, pressure is applied to the opposite side of the piston head 130 whereby the piston moves rightward and reaches the position shown in FIG. 5. At this time, the pressure passage 148, the throughhole 136 and the stud passage 138 are transversely in alignment with one another so that the stud inside the throughhole 136 is shifted toward the outlet 140 and from thence, supplied to the welding gun.

Before operation, the stud welding apparatus of the present invention is in the condition shown in FIG. 1 where both spindle 28 and cylinder 58 are pushed by the spring 88 to their foremost position while the piston 66 and push pin 74 are at their rearmost position. The stud 40 is fed into the hole 34 of the spindle 28 from the tubular member 38 through the side port 36. At this time it is obvious that, none of the legs 52 contact the work surface and that no current flows between the legs and the connector 106, cable 104, cylinder 58, spindle 28 and collet 44.

Next, when the pressurized fluid is applied to the opposite end of the cylinder 58, that is, to the rear end, the piston 66 and hence, the push pin 74, advance and push forward the stud inside the hole 34 into the collet 44 so that the stud 40 protrudes beyond the collet 44 to a predetermined length (see FIG. 2). In this instance, the tip of the stud must be positioned beyond the tip of the leg 52. The stud 40 is reliably supported because the collet 44 is inwardly pressed in the radial direction by the bushing 46 under the action of the spring 44.

As shown in FIG. 3, the stud 40 is next pressed against the work surface 51 so that the three legs 52 also are in contact with the work surface. At this time, the spindle 28 and hence, the cylinder 58, are caused to move backward against the force of the spring 88 whereby the actuator 92 on the cylinder 58 engages and actuates the microswitch 94 and sends a start signal to an electric control circuit to be described later. As the pressurized fluid is applied to the back surface of the piston 66 in this case, the stud 40 is pushed forward inside the collet 44. Nonetheless, the spindle 28 and hence, the collet 44, are caused to move backward. Accordingly, the force of the spring 48 acts more strongly on the bushing 46 and the stud 40 is supported more strongly.

When the three legs 52 and the stud 40 are brought into reliable contact with the work surface 51 in this manner, the electric control means detects the condition in a manner to be described and feeds a welding current through the connector 106, cable 104, cylinder 58, spindle 28, collet 44, stud 40 and work surface 51, thereby causing arc discharge between the work surface and the tip of the stud in order to accomplish welding. After the passage of a predetermined period of time, the current is automatically stopped and the stud 40 is cooled to complete welding.

When the welding apparatus is separated from the work surface, the cylinder 58, the spindle 28 and the collet 44 are caused to move forward due to the force of the spring 88 so that the force of the spring 48 acting on the bushing 44 is weakened and the stud 40 easily separated from the collet 44. In this case, since the microswitch 94 also is cut off from the actuator 92, the entire operation is completed. Next, when a start button or the like is manipulated, the stud is supplied to the hole of the spindle 28, and the above-mentioned procedures is repeated in the same way.

Figure 6A:
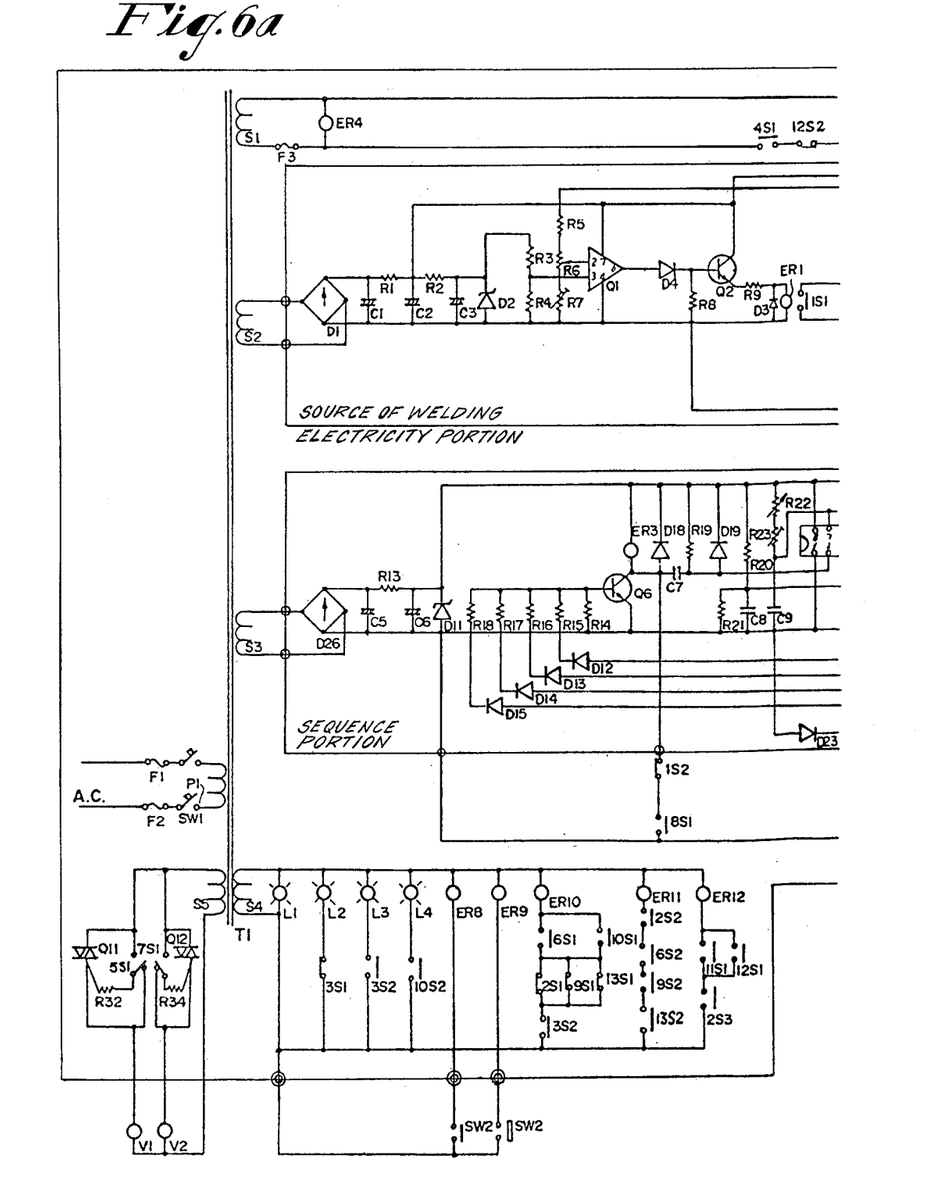
FIGS. 6a and 6b are a circuit diagram of an example of the electric control means used in the present invention.
Figure 6B:
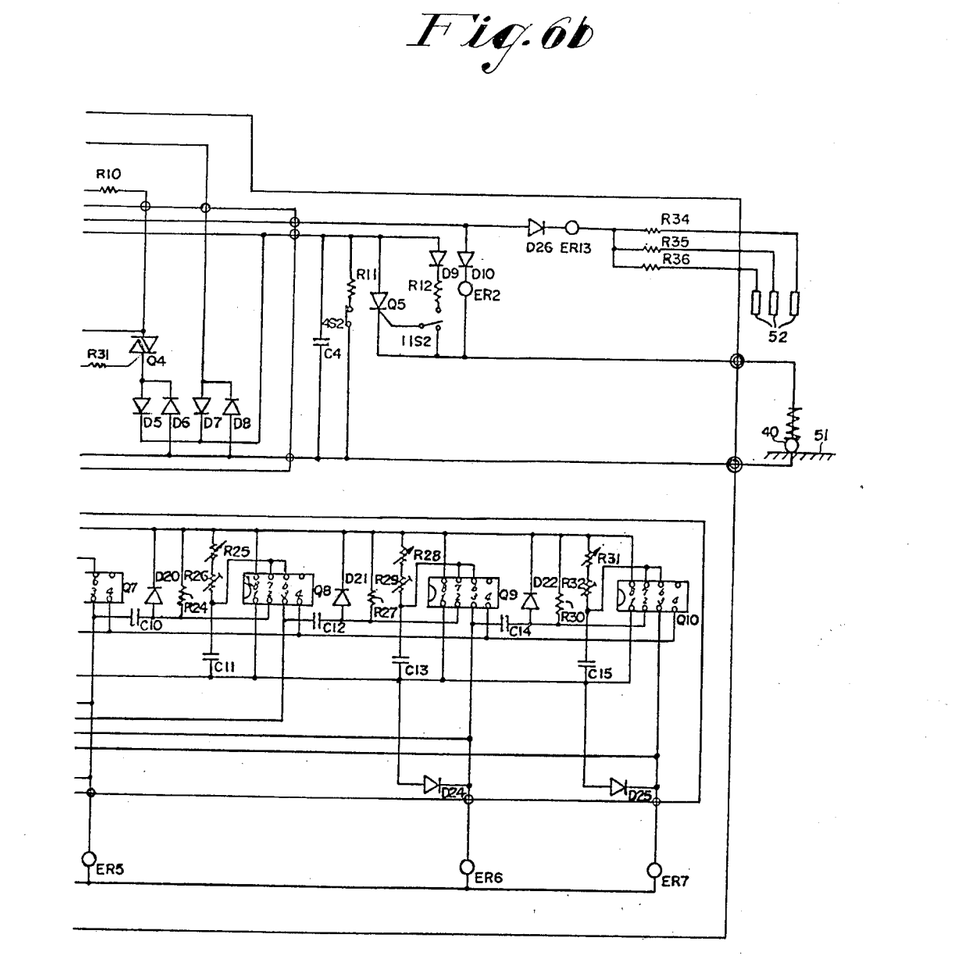

FIG. 6 shows a circuit diagram of the electric control means which can be used in the stud welding apparatus of the present invention. It should be understood that other types of electric circuit may also be used.

The electric control means of FIG. 6 comprise a welding power source section and a sequence section. The welding power source section consists of a charging voltage control circuit, a charging control circuit, a welding power source capacitor and a welding current control circuit.

When a primary winding P1 of a transformer T1 is connected first to the power source by closing a switch SW1, a voltage is produced across secondary windings S1-S5 of the transformer. The current of secondary winding S2 is converted to a direct current by a rectifier D1, capacitors C1, C2, C3, and resistors R1, R2.

A constant voltage divided by a constant-voltage diode D2 and resistors R3, R4 is applied to the terminal 3 of a differential amplifier Q1. A charging voltage of a welding power source capacitor C4 is divided by a resistor R5 and variable resistors R6, R7 and applied to the terminal 2 of differential amplifier Q1. If the voltage of the terminal 2 is lower than that of the terminal 3, a voltage of high potential appears on the terminal 6. The high potential voltage is applied to the base of a transistor Q2 through a rectifier D4. In this case, the transistor Q2 is conductive and its collector voltage energizes the coil of a relay ER1 through its emitter. The contact 1S1 of the relay ER1 connects the anode of a triac (triode AC switch) Q4 to its gate via a resistor R31. When the contact 1S1 is closed, the anode voltage of the triac Q4 is applied to the gate through R31; hence, triac Q4 becomes conductive.

The voltage of the secondary winding S1 of the transformer T1 actuates a relay ER4 to close its contact 4S1 and open its contact 4S2. When a relay contact 12S2 is closed for charging operation, the current of the secondary winding S1 flows through relay contacts 4S1, 12S2, a charging current control resistor R10 and through the triac Q4 which is in the conductive state, and is rectified by four bridge-connected rectifiers D5, D6, D7, D8 and then stored in the capacitor C4. As the charging voltage increases and the voltages at the terminals 3 and 2 of the differential amplifier Q1 becomes equal to each other, the voltage at terminal 6 changes to that of a low potential. Since the base voltage of the transistor Q2 drops at this time, Q2 becomes non-conductive, the relay ER1 is deactivated, its contact 1S1 is opened, the triac Q4 becomes non-conductive and the capacitor C4 stops charging. The division ratio of the charging voltage of the capacitor C4 applied to the terminal 2 of the differential amplifier Q1 varies when the variable resistor R6 is adjusted. For this reason, it is possible to set the charging voltage of the capacitor C4 to an optional value.

The sequence section consists of a reset circuit for preventing erroneous action at the time of connecting the power source, an input circuit for receiving an operation start signal from outside and rejecting the signal applied during operation until the operation is completed, and a timer circuit for controlling the stud feed time, welding-delaying time, weld signal-generating time and feeder action time.

The voltage of the secondary winding S3 of the transformer T1 is converted to a direct current by a rectifier D26, capacitors C5, C6, a resistor R13 and a constant-voltage diode D11.

When the capacitor C4 attains a set charging voltage, the relay contact 1S2 is closed. When a relay ER8 is actuated by an operation start signal from the outside (contact SW2 is closed), its contact 8S1 is closed and the voltage on the primary side of the capacitor C7 becomes zero. In this case a negative pulse is generated on the secondary side of C7 by the capacitor C7, a resistor R19 and a rectifier D19 and is applied to the terminal 2 of a timer element Q7. The voltage at terminal 3 of Q7 changes from a low potential to a high potential at this time. After the lapse of a predetermined period of time set by variable resistors R22, R23 wired respectively to the terminals 6,7 of Q7 and by a capacitor C9, the voltage at terminal 3 again changes to the low potential. Within this set period the stud is fed from the feeder to the stud welding apparatus.

The high potential voltage at the terminal 3 of the timer element Q7 is applied to the base of a transistor Q6 through a rectifier D12 and a resistor R15, thereby rendering Q6 conductive. As the collector of Q6 attains a low potential voltage and the voltage on the primary side of the capacitor C7 also attains a low potential, no negative pulse is generated on the secondary side of the capacitor C7 even if the operation start signal is applied. Also, since the transistor Q6 becomes conductive at this time, the relay ER3 connected to its collector is actuated.

The high potential voltage at the terminal 3 of the timer element Q7 actuates a relay ER5. The contact 5S1 of this relay connects the anode of a triac Q11 to its gate via a resistor R32. When the contact 5S1 is closed, the anode voltage of the triac Q11 is applied to the gate through the resistor R32 so that Q11 becomes conductive. This triac Q11 is electrically interposed between the secondary winding S5 of the transformer T1 and an electromagnetic valve V1. When the triac Q11 is conductive, the electromagnetic valve V1 is actuated and opened whereby the pressure fluid operates the piston 66. At this time the stud is fed from the feeder to the stud welding apparatus and supported by the collet 44.

When the stud is brought into contact with the work surface, a contact confirmation signal flows from the stud to the workpiece through the rectifier D10 and the relay ER2, thereby actuating the relay ER2. When the stud is accurately brought into pressure contact with the work surface, the micro-switch 94 and hence, SW3, are closed. Consequently, the relay ER9 is actuated.

When the three legs 52 contact the work surface, a perpendicular confirmation signal flows to the workpiece through three resistors R34, R35, R36 wired in parallel via a rectifier D26 and a relay ER13 and through the legs 52 that are respectively wired to these resistors. The resistance of these resistors is selected such that the relay ER13 is actuated when all legs 52 contact the workpiece and the stud is perpendicular to the work surface.

Next, when the terminal 3 of the timer element Q7 returns again to the low potential voltage, a negative pulse is impressed to the terminal 2 of a timer element Q8 by a rectifier D20, a capacitor C10 and a resistor R24 and the terminal 3 of the element Q8 changes from the low potential voltage to the high potential voltage. After the passage of a predetermined period of time set by variable resistors R25, R26 respectively wired to the terminals 6,7 of the timer element Q8 and by a capacitor C11, the terminal 3 again changes to the low potential voltage. Within this set period the stud is pressed to the work surface and then stops while being supported by the collet.

The high potential voltage at the terminal 3 of the timer element Q8 is applied to the base of a transistor Q6 through a rectifier D13 and a resistor R16 whereby the transistor becomes conductive and keeps its collector at the low potential voltage.

Subsequently, when the terminal 3 of the timer element Q8 again returns to the low potential voltage, a negative pulse is applied to the terminal 2 of a timer element Q9 by a capacitor C12, a rectifier D21 and a resistor R27 and its terminal 3 changes form the low potential voltage to the high potential voltage. After the lapse of a predetermined period of time set by variable resistors R28, R29 wired respectively to the terminals 6, 7 of the timer element Q9 and by a capacitor C13, the terminal 3 again changes to the low potential voltage. A welding signal is generated during this period.

As a relay ER6 is actuated by the high potential voltage at the terminal 3 of the timer element Q9, its contact 6S2 is closed. In this instance, if the stud is in contact with the work surface, the relay contact 2S2 is closed. If the stud is reliably in pressure contact with the work surface, the relay contact 9S2 also is closed. Furthermore, if all legs 52 are in contact with the work surface, or, when the stud is perpendicular to the work surface, the relay contact 13S2 is closed. Accordingly, the current of the relay ER11 flows through the contacts 2S2, 6S2, 9S2 and 13S2 and actuates the same.

The normally-closed contact of the contact 11S2 of the relay ER11 is interposed electrically between the cathode and the anode of a thyristor Q5 for controlling the welding current while its normally-open contact is interposed between the anode and the gate via a rectifier D9 and a resistor R12. When the relay ER11 is actuated, the normally-open contact of the contact 11S2 is closed and the anode voltage of the thyristor Q5 is applied to the gate through a rectifier D9 and a resistor R12, thereby rendering the thyristor conductive. In this instance, the charging voltage of the capacitor C4 is impressed between the stud and the workpiece through the thyristor Q5 and generates arc discharge between them. Hence, welding is made by the arc discharge.

So long as the stud is in contact with the workpiece, the relay ER2 is kept closed. Under this condition, if the contact 11S1 of a relay ER11 is closed, a relay ER12 is actuated and its contact 12S1 is closed. The relay ER12 is kept actuated till the contact 2S3 is opened. Since the contact 12S2 of the relay ER12 is open at this time, the flow of the charging current of the secondary winding S2 of the transformer T1 stops and the capacitor C4 stops charging.

When the stud 40 comes off from the collet 44 and the relay ER2 is turned off, the contact 2S3 is opened and the contact 12S2 is closed. Hence, charging is resumed to the capacitor C4.

Even if the welding signal generation circuit operates and the relay ER6 is actuated, no welding current flows in either of the following cases where the relay ER2 is not actuated because the stud 40 is out of contact with the workpiece 51, where the relay ER9 is not actuated because the stud is out of reliable pressure contact with the work surface and where the relay ER13 is not actuated because the stud is not perpendicular to the work surface.

In this case, since at least one of the normally-closed contacts 2S1, 9S1 and 13S1 is closed, the relay ER10 is actuated if the contact 6S1 of the relay ER6 is closed. During the welding process, the contact 3S2 of the relay ER3 is kept closed. Since the contact 10S1 of the relay ER10 is closed, the welding process is completed even if the contact 6S1 is open and the relay ER10 is kept actuated till the contact 3S2 opens. At this time the contact 10S2 of the relay ER10 is closed and a stud-feed defect pilot lamp L4 is turned on.

Next, when the terminal of the timer element Q9 returns again to the low potential voltage, a negative pulse is impressed to the terminal 2 of the timer element Q10 by the capacitor C14, the rectifier D22 and the resistor R30. After the lapse of a predetermined period of time set by variable resistors R31, R32 wired respectively to the terminals 6, 7 of the timer element Q10 and by a capacitor C15, the terminal 3 again changes to the low potential voltage. Within this set period the feeder operates and feeds the stud 40 into the stud passage 124 of the stud feed section.

The high potential voltage at the terminal 3 of the timer element Q10 is impressed through a rectifier D15 and a resistor R18 to the base of a transistor Q6 and renders it conductive. Hence, the collector of the transistor keeps the low potential voltage.

The contact 7S1 of a relay ER7 actuated by the high potential voltage of the timer element Q10 connects the anode and the gate of the triac Q12 via a resistor R34. When this contact 7S1 is closed, the anode voltage Q12 is applied to the gate through a resistor R32 and renders the triac conductive. The triac Q12 connects the secondary winding S5 of the transformer T1 to the feeder and feeds out the stud from the feeder when it is conductive.

Next, when the terminal 3 of the timer element Q10 again returns to the low potential voltage, the base voltage of the transistor Q6 becomes low potential through the rectifiers D15, D18 whereby its collector voltage increases, inactivates the relay ER3 and renders the primary side of the capacitor C7 to the high potential voltage. At this time the contact 3S2 of the relay ER3 is opened and the pilot lamp L3 is turned off. Also, the contact 3S1 is closed and turns on the operation stop pilot lamp L2.

Thereafter, when the operation start signal is applied from outside, the above-mentioned operation is repeated.

What is claimed is:

1. A stud welding apparatus including: a body housing; wall structure forming a gun housing secured to and insulated from the front end of said body housing and having an opening at the tip thereof; a spindle made of an electrically conductive material incorporated in said gun housing spaced apart and insulated from said gun housing wall, supported slidably in the longitudinal direction and having a hole penetrating therethrough in the axial direction and a side port at the front end thereof; a tubular member fitted to said wall of said gun housing and adapted to supply a stud to be welded to said side port; a stud feed port connected to a stud supply source; three legs made of an electrically conductive material secured in the insulated state around the outer circumference of said gun housing with a predetermined gap therebetween in front of said stud feed port and protruding forward beyond the tip of said gun housing by the same distance and in parallel with one another; a cylinder made of an electrically conductive material disposed inside said body housing in the insulated state and concentrically with said spindle, connected mechanically and electrically to the rear end of said spindle and allowed to slide together with said spindle; a piston slidably disposed in said cylinder and caused to move in the axial direction of said cylinder due to a pressure difference applied onto the front and back surfaces thereof; a push member extending forward from said piston and fitted slidably into said hole of said spindle; a collet made of an electrically conductive material fitted to the tip of said spindle, protruding outward beyond said opening at the tip of said gun housing and capable of receiving and supporting resiliently and firmly said stud to be welded when said stud is pushed forward by said push member of said piston; a spring device adapted to constantly push forward said cylinder and resiliently retract said spindle and hence, said cylinder, when said stud to be welded supported by said collet is pressed against a workpiece; a switch device actuated when said cylinder moves back to a predetermined position; a pressure feed conduit communicated with the inside of said cylinder at the front and back ends thereof and with a pressure fluid source; and electric control circuit means connected electrically to said legs, said cylinder and said switch device and adapted to control said stud supply source, said pressure fluid source and a welding current source in accordance with a predetermined sequence, said legs being interconnected into said electric control circuit means such that no welding current is allowed to flow to a stud supported by said collet unless a current flows simultaneously through said three legs.

2. The stud welding apparatus as defined in claim 1 wherein said stud feed port comprises a tubular member fitted to said gun housing in such a manner as to have an axis describing an acute angle with respect to the axis of said spindle.

3. The stud welding apparatus as defined in claim 1 wherein said push member comprises a piston rod of said piston and a push pin screwed into said piston rod in the axial direction thereof, said push pin being capable of adjusting the protrusive length of said stud from said collet when said push pin is rotated and moved back and forth with respect to said piston rod.

4. The stud welding apparatus as defined in claim 1 wherein said electric control circuit means includes resistor means respectively wired in series with said three legs and incorporated in said circuit.

* * * * *